(No Model.)

C. C. PLATT.
WEEDER AND CULTIVATOR.

No. 501,360. Patented July 11, 1893.

WITNESSES:

INVENTOR

ATTORNEYS.

UNITED STATES PATENT OFFICE.

CHARLES C. PLATT, OF WAVERLY, KANSAS.

WEEDER AND CULTIVATOR.

SPECIFICATION forming part of Letters Patent No. 501,360, dated July 11, 1893.

Application filed February 7, 1893. Serial No. 461,359. (No model.)

*To all whom it may concern:*

Be it known that I, CHARLES C. PLATT, of Waverly, in the county of Coffey and State of Kansas, have invented a new and Improved Weeder and Cultivator, of which the following is a full, clear, and exact description.

My invention relates to an improved combined weeder and cultivator especially adapted for working listed corn, and the object of the invention is to construct the machine in a simple, durable and economic manner, and to provide a convenient means for adjusting the runners to or from one another so as to increase or decrease the space between them; and also to provide a means whereby cultivators capable of being adjusted both vertically and laterally independently, may be so attached to a common frame and the frame connected with the runners, that the frame carrying the cultivators may be of itself raised and lowered so as to bring the cultivators into action or remove them from engagement with the ground.

It is a further object of the invention to provide weeders in connection with the runners, the said weeders consisting of two blades located at each side of the machine, one blade being shorter than the other, and all the blades being given a rearward inclination, but one blade, the longer one, a downward inclination and the shorter blades an upward inclination, whereby the longer blade will remove weeds from the tops of ridges while the shorter blades will cut the weeds from the sides of the ridges.

Another object of the invention is to so distribute the cultivators that one set will operate upon the ridges while another set will loosen the ground at each side of the row of corn and within the space between the runners, proper shields being provided to protect the plants.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
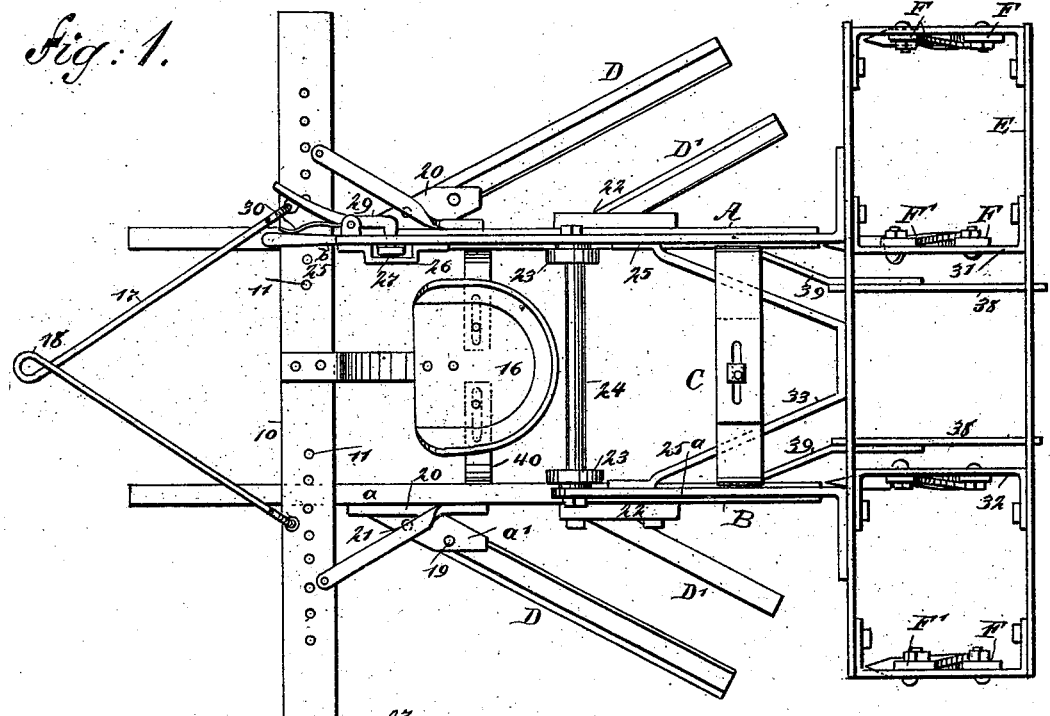
Figure 2:
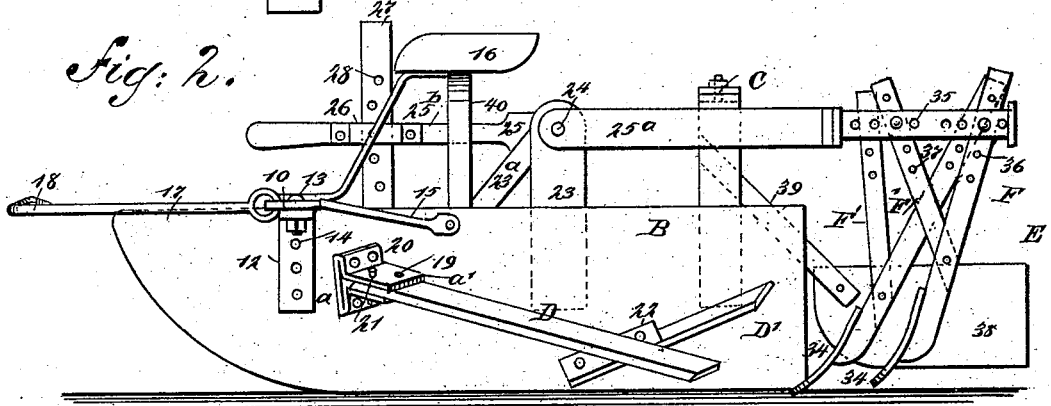
Figure 3:
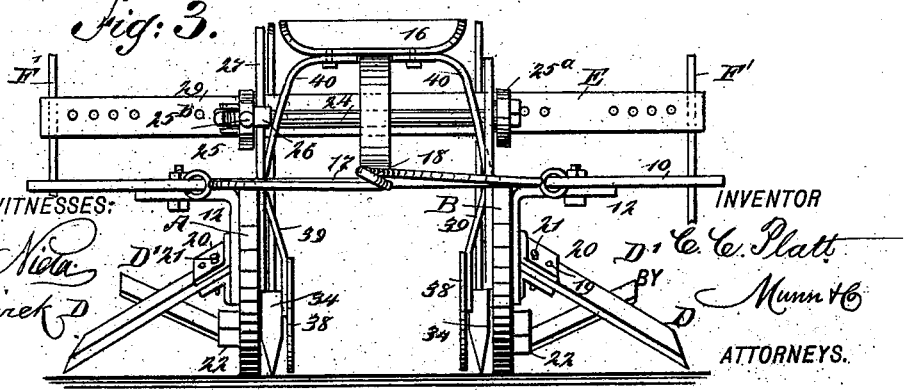

Figure 1 is a plan view of the machine. Fig. 2 is a side elevation thereof, and Fig. 3 is a front elevation of the machine.

Two runners A and B, are adapted to be supported in an upright position at a desired interval apart. These runners are adapted to travel in the bottom of listed rows at each side of a row of corn to be cultivated. The runners are held in adjustable connection, first by means of a front bar 10; this bar extends preferably some distance beyond the outer face of both runners, and is provided with a series of apertures 11, arranged in two longitudinal rows, one row being at each side of the center as shown in Fig. 1. The adjustable connection is effected between this front bar 10 and the runners A and B through the medium of brackets 12, which brackets are secured upon the outer faces of the runners near their forward ends, and bolts 13, or their equivalents are passed through an aperture in the upper surface of each bracket, as said brackets are angular, and through an aperture 11 of each row in the front bar.

In order that the front bar may be raised or lowered according to the height of the corn under treatment, the vertical members of the brackets are provided with apertures 14, through which the fastening bolts are passed. Thus the attachment between the brackets and the runners is an adjustable one. The front bar is stayed or braced through the medium of stay rods 15, which are attached to the runners at their outer faces at the rear of the front bar and to the upper surface of said bar, the connection between the stays 15 and the runners being preferably a pivotal one. A further connection is effected between the runners, which consists of an arch C, located near the rear portion of the runners and extending upwardly therefrom. This arch is made in two sections, one section having sliding movement upon the other; and the two sections are connected by one or more bolts, as shown in Fig. 1. Thus it will be observed that the runners may be expeditiously and conveniently adjusted to or from one another.

The driver's seat 16, is attached to a spring shank which shank is secured to the central portion of the front bar 10, which bar may serve as a foot rest for the driver; and a draft rod 17, preferably of somewhat triangular construction is connected at its diverging ends with the front bar 10, at each side of its center, as is likewise best shown in Fig. 1; and at the contracted end of the draft bar a loop 18, is formed, to permit the attachment to the draft bar of a single or double-tree. While the seat 16 is shown attached to the springs 40, it is preferably made to simply rest upon them.

As the weeders are one of the prime features of this invention I will first describe them and their location. Two weeders D and D' are located upon the outer face of each runner. Both weeders consist of straight blades, their cutting edges being made tapering or beveled, and the blade of the front weeder is much longer than the blade of the rear weeder. The blade of the front weeder is secured by means of a bolt 19 or its equivalent, in a bracket or clamp 20, the said bracket or clamp being located upon a runner between its center and forward edge. The bracket or clamp 20, is adjustably attached to a runner, the adjustment being in a vertical direction; and as the bracket or clamp comprises a body member $a$ and shank members $a'$, the adjustment may be effected by producing a series of apertures in the runners in vertical alignment and passing the bolts that are passed through the body of the bracket through any one of the apertures. The blade of the weeder D, is passed between the shank members of the bracket 20, and as the shank member of the bracket 20 is given a downward and rearward inclination as shown in both Figs. 1 and 2, the straight blade of the weeder D, is compelled to take the same direction or position; and in order that the blade, when placed within the shank, shall naturally assume its proper position, the inner end of the plate is properly beveled. By reason of the outer end of the weeder D being much lower than its inner end, and also by reason of its rearward inclination, the outer portion only of the blade will engage with the top of the ridges over which it passes, and will cut the weeds therefrom with a shearing cut. In order to strengthen the blade of the forward weeder against the strain to which it would be subjected when brought in contact with stones, stumps, or other objects it is incapable of cutting, a pin 21, is passed through the shank of the bracket at one side of the bolt 19 securing the blade to the bracket, as shown in Fig. 2; and as any extraordinary strain brought to bear upon the blade must be sustained by the bracket the pin is placed in position to receive the burden of said strain. The rear weeder D', consists of a blade shorter than that of the forward weeder, and this blade is given an upward and rearward inclination across the forward blade when the machine is viewed from the front as shown in Fig. 3. This blade is adapted to cut all the weeds from the sides of the ridges, and it is preferably attached to a block 22, the said block being adjustably attached to a runner in like manner as the forward bracket or clamp 20, and although they are shown rectangular in cross section they may be and preferably are made transversely round. Near the center of each runner a standard 23, is located and strengthened by suitable braces 23ª. These standards are adapted to act as bearings for a shaft 24, the shaft extending through the outer faces of the standards. Two parallel levers are attached to the outer ends of the shaft, one lever being located practically over each runner. These levers extend rearward in contact with the sides of the rear arch C, and are designated in the drawings as 25 and 25ª. The right hand lever 25, extends forwardly beyond its connection with the shaft 24; but the left-hand lever 25ª stops at the shaft, and the forward extension of the right hand lever is shaped as a handle 25ᵇ, the said handle being provided with a loop or socket 26, which loosely receives a post 27, secured to the right hand runner. This post is provided with a series of apertures 28, and the handle may be locked in a high or in a low position upon this post by pivoting a lock lever or thumb latch 29 upon the outer face of the handle 25ᵇ, the forward extremity of the lock lever or latch being pressed by a spring 30, in such manner as to cause the head of the latch to pass through an aperture in the handle and into one of the apertures 28 in the guide or locking post. When the handle of the main lever 25 is grasped the latch handle may be gripped also; both are within convenient reach of the driver. A frame E, of preferably rectangular construction and of greater length than width is attached securely to the ends of the main levers 25 and 25ª, as shown in Fig. 1, the frame being of sufficient length to extend some distance beyond the outer faces of the runners. Two cross bars 31 and 32, are located in the frame, one near each runner, the position of the cross bars being such that they are nearly opposite the outer edges of the space between the runners. As an additional support the frame E is attached to a bracket 33, preferably an A bracket, the said bracket at its inner ends being attached to the levers 25 and 25ª. The end bars of the frame and the cross bars 31 and 32, are each adapted to carry a cultivator blade or shovel 34. To that end, each of the said bars has connected with it a shank F, and each shank is provided with an upwardly and forwardly extending branch F'. The bars to which the plow shanks are to be applied are provided with a series of apertures, and the branches or arms F' of the shanks themselves are also provided with a series of apertures, the apertures in the supporting bars being designated as 35, those in the shank as 36 and those in the branch or arm of the shank 37. Thus it will be observed that the shanks may be set one in advance of the other, or one at the rear of the other, and they may be vertically adjusted so that, for example, the outer shovels will run deeper than the inner ones, as shown in Fig.

2. The branch or arm F', is attached to each shank in order that a double bearing may be obtained upon the supporting bar, as by passing a pin through the shank and bar and another through the arm of the shank and supporting bar, the shank will be held in firm position no matter what obstacle the shovel attached to the shank may have found.

The inner shovels loosen the ground near the inner faces of the runners, and consequently throw the earth in direction of the row of plants; and in order that the plants may not be harmed in any manner, fenders 38, are located at the rear of the machine, the said fenders being preferably placed in parallel lines, and they are attached by arms 39 to the inner faces of the arch C.

This device is exceedingly simple and economic in its construction, and it is capable of doing effective work, both cultivating the corn and weeding it. As a support for the driver's seat 16, bars 40, are attached to the bottom of the seat and are curved downwardly to an engagement with the inner faces of the runners.

Having thus described my invention, I claim as new and desire to secure by Letters Patent—

1. In a machine for the cultivation of corn, the combination, with runners located a predetermined distance apart, of weeders attached to the runners, one near the front and the other near the rear, each weeder comprising a blade and a socket to receive the blade, the sockets being adjustably attached to the runners, the forward blades, which are the longest, having a rearward and downward inclination, and the rear blades an upward and rearward inclination, a bolt fastening the forward or longer blade to its socket, and a stay pin passed through the socket and the blade at one side of the fastening device, as and for the purpose specified.

2. In a machine for the cultivation of listed corn, the combination, with runners, levers fulcrumed upon the runners, and a frame attached to the rear portion of the levers, of plow shanks attached to the frame at its ends and at each side of the center, the shanks having vertical and lateral adjustment upon their supports, the inner set of shanks being located opposite the space between the runners, shovels attached to the shanks, and fenders carried by the runners and located between the inner set of shanks, as and for the purpose specified.

3. In a machine for the cultivation of corn, the combination, with runners located a predetermined distance apart, levers fulcrumed upon the runners, a locking device connected with the levers at their forward ends, and a frame secured to the rear ends of the levers, the frame being located transversely across the rear of the runners, and cross bars located at each side of the center of the frame, of plow shanks connected with the cross bars and end bars of the frame, the said shanks having vertical and lateral adjustment, arms projected from the plow shanks and having vertical and lateral adjustment upon the supports of the shanks, and means, substantially as shown and described, for adjusting the runners to and from each other, as and for the purpose set forth.

4. In a machine for working listed corn, the combination, with runners adjustably connected, weeders located at the sides of the runners, the weeders being of different length, the forward weeder being longer than the rear one, the forward weeder having a downward and rearward inclination and the rear weeder an upward and rearward inclination, and levers fulcrumed upon the runners and provided with locking devices, of a frame secured to the rear ends of the levers, the frame extending transversely across the rear ends of the runners, cross bars located one at each side of the center of the frame, plow shanks provided with forward arms or extensions, the shanks and extensions having vertical and laterally adjustable connection with the cross bars and end bars of the frame, and fenders carried by the runners and located between the inner set of plow shanks for the purpose of protecting the standing corn, substantially as and for the purpose specified.

CHARLES C. PLATT.

Witnesses:
C. BEASLEY,
H. L. COOPER.